United States Patent

Gylov et al.

[11] Patent Number: 5,931,375
[45] Date of Patent: Aug. 3, 1999

[54] VALVE FOR A SYSTEM HAVING AN ENERGY-CARRYING MEDIUM

[75] Inventors: Hans Henrik Gylov, Holm; Ole Joergensen; Carsten Moeller, both of Slagelsc, all of Denmark

[73] Assignee: Frese Armatur A/S, Slagelse, Denmark

[21] Appl. No.: 08/821,843

[22] Filed: Mar. 21, 1997

Related U.S. Application Data

[63] Continuation-in-part of application No. PCT/DK95/00373, Sep. 19, 1995.

[30] Foreign Application Priority Data

Sep. 23, 1994 [DK] Denmark .................................. 1098/94

[51] Int. Cl.$^6$ .................................................. G05D 27/00
[52] U.S. Cl. ................. 236/42; 137/505.38; 137/614.17; 236/92 R; 251/902
[58] Field of Search ............................ 236/42, 43, 92 R; 137/505.38, 614.17; 251/902, 212

[56] References Cited

U.S. PATENT DOCUMENTS

| | | | |
|---|---|---|---|
| 2,733,865 | 2/1956 | Ehlke | 236/92 B |
| 3,838,812 | 10/1974 | Johnson | 236/42 |
| 4,508,262 | 4/1985 | Pedersen et al. | 236/42 |
| 5,178,324 | 1/1993 | Moesby | 237/8 R |
| 5,213,132 | 5/1993 | Comment | 137/505.38 |

*Primary Examiner*—William E. Tapolcai
*Attorney, Agent, or Firm*—Pennie & Edmonds LLP

[57] ABSTRACT

Energy exchanger valve (8) with thermostat valve (12), a housing (9) with inlet (20) and outlet (21), a thermostat bellows displaceable spindle (30) with seal (42) which, by the expansion/contraction of the thermostat bellows and against the pressure of a surrounding spring (31) can close/open an opening (27) with a seating (27*a*) in a transverse wall (24) between the inlet (20) and the outlet (21), and a piston (13) controlled by differential pressure for the control of a medium's differential pressure across a pre-setting (11) and a thermostat valve (12) consisting of the seating (27*a*) and the seal (42) between the inlet (20) and the piston (13), the thermostat valve (12) being able to cut off the flow between the inlet and the outlet independently of the pre-setting (11). With the valve (8), only a predetermined maximum amount of the energy-carrying medium flows through the energy exchangers (5). If the differential pressure is increased when the valves on a pipe length are closed, the flow in the individual energy exchangers (5) is not increased.

16 Claims, 2 Drawing Sheets

VALVE FOR A SYSTEM HAVING AN ENERGY-CARRYING MEDIUM

CROSS-REFERENCE TO RELATED APPLICATIONS

This is a continuation-in-part application of International Application PCT/DK95/00373, which has an international filing data of Sep. 19, 1995.

BACKGROUND OF THE INVENTION

This invention concerns a valve for a system having an energy-carrying medium which flows through a number of energy exchangers in the system, said valve having a thermostat valve with a housing comprising an inlet and an outlet, a spindle with a seal which can be displaced by a thermostat bellows and which, depending on the expansion/contraction of the thermostat bellows and against the force of a spring which surrounds the spindle, can respectively close and open an opening with a seating in a transverse wall in the housing between the inlet and the outlet.

The plant may for example be a circulation plant where the fluid medium after being heated gives off energy to or after being cooled takes up energy from the surroundings or to/from a secondary fluid medium through at least one energy exchanger or a similar object. Such plants are generally called heating plants or cooling plants (air-conditioning), respectively.

A central heating plant with a similar valve is known from U.S. Pat. No. 5,178,324, said plant being configured in such a manner that it is possible to control the flow in the entire plant, a single part of the plant or in several zone-divided sections of the plant.

This plant comprises several energy exchangers each provided with its own valve, said energy exchangers being intended to be placed in a number of at least one in each room in a building, and where the valves are disposed in the piping of the plant.

In central energizing plants it is important that the water is distributed through the plant in a pre-calculated proportion so that the dimensioned energy requirements of the individual energy exchangers are taken into consideration.

It is also important that the energy-carrying liquid remains in the energy exchangers for a period of time which is long enough to allow a reasonable amount of energy to be dissipated in the rooms of the building which are to be energized by the energy exchangers, which can be ensured by means of a differential pressure valve placed in the individual branches of the plant, in that this valve can regulate the flow of the energy-carrying fluid.

Furthermore, it is important that the differential pressure across the individual energy exchangers is so low that noise does not arise in the valves, in that such noise can cause inconvenience, either directly or by transmission through the piping system.

In the individual rooms, the flow of energy-carrying liquid through the energy exchanger or each of the energy exchangers can be controlled by means of thermostatic valves which, depending on the temperature in the room, can open more or less to allow flow through the energy exchanger(s) so that the emission of energy to the rooms can be held within those limits which are determined by the accuracy of the thermostatic valves, and by the temperature which the user of the room desires to maintain by the adjustment of the thermostatic valve or valves.

When ordinary thermostatic valves are mounted in a length of piping which leads the energy-carrying medium from a energy exchanger to the subsequent energy exchangers, each of these thermostatic valves will be dependent on the others. Thus if ten thermostatic valves are mounted in a length of piping, and nine of these are closed, the differential pressure across the open valve will be increased. This results in an increase in the flow through the associated energy exchanger, and the increased flow can also give rise to disturbing noise.

This situation can arise, for example, at times of the year when the incidence of sunlight makes energizing unnecessary. If there is also opened a window in that room in which the open thermostatic valve is mounted, the associated energy exchanger will receive a considerably greater flow than would otherwise be the case.

It is also difficult to achieve a mutual balance between the individual pipes in the building, the reason being that the flow will change depending on the differential pressure. Today, this drawback is overcome by providing each length of piping with an extra valve which is carefully adjusted to ensure the balance between the individual pipes.

BRIEF SUMMARY OF THE INVENTION

The object of the present invention is therefore to improve a valve of the kind described so that the above-mentioned drawbacks of an energizing plant can be avoided.

This object is achieved by means of a valve of the above-mentioned kind, said valve according to the invention being characteristic in that the valve is further provided with a piston which is controlled by a differential pressure for the regulation of the differential pressure of the energy-carrying medium across an adjustable pre-setting, and the thermostatic valve consisting of the seating and the seal between the inlet and the piston, and that the thermostatic valve is arranged to be able to cut off the flow between the inlet and the outlet independently of the adjustable pre-setting.

The piston in the valve according to the invention thus maintains a constant differential pressure across the adjustable pre-setting and across the seating and the seal together.

It is hereby achieved that the valve according to the invention can be adjusted to allow only a predetermined maximum amount of the energy-carrying medium to flow through the valve independently of the remaining energy exchangers and pressure conditions in the plant. If the differential pressure is increased, for example because one or more of the remaining valves on a length of piping are closed, this will not result in an increase in the flow through the individual energy exchanger.

Moreover, in certain cases a reduction in noise can be achieved, in that the pressure/flow is reduced in three steps, whereas in the ordinary thermostatic valves this is effected in one or two steps.

Furthermore, it will not be necessary to mount an extra valve in order to mutually balance the individual pipe lengths.

The dependent claims disclose expedient arrangements of the valve according to the invention.

BRIEF DESCRIPTION OF THE DRAWINGS

In the following, the valve according to the invention will be described in more detail with reference to the drawing, where FIG. 1 schematically shows a commonly known, double pipe energizing plant.

DETAILED DESCRIPTION OF THE INVENTION

Figure 1:
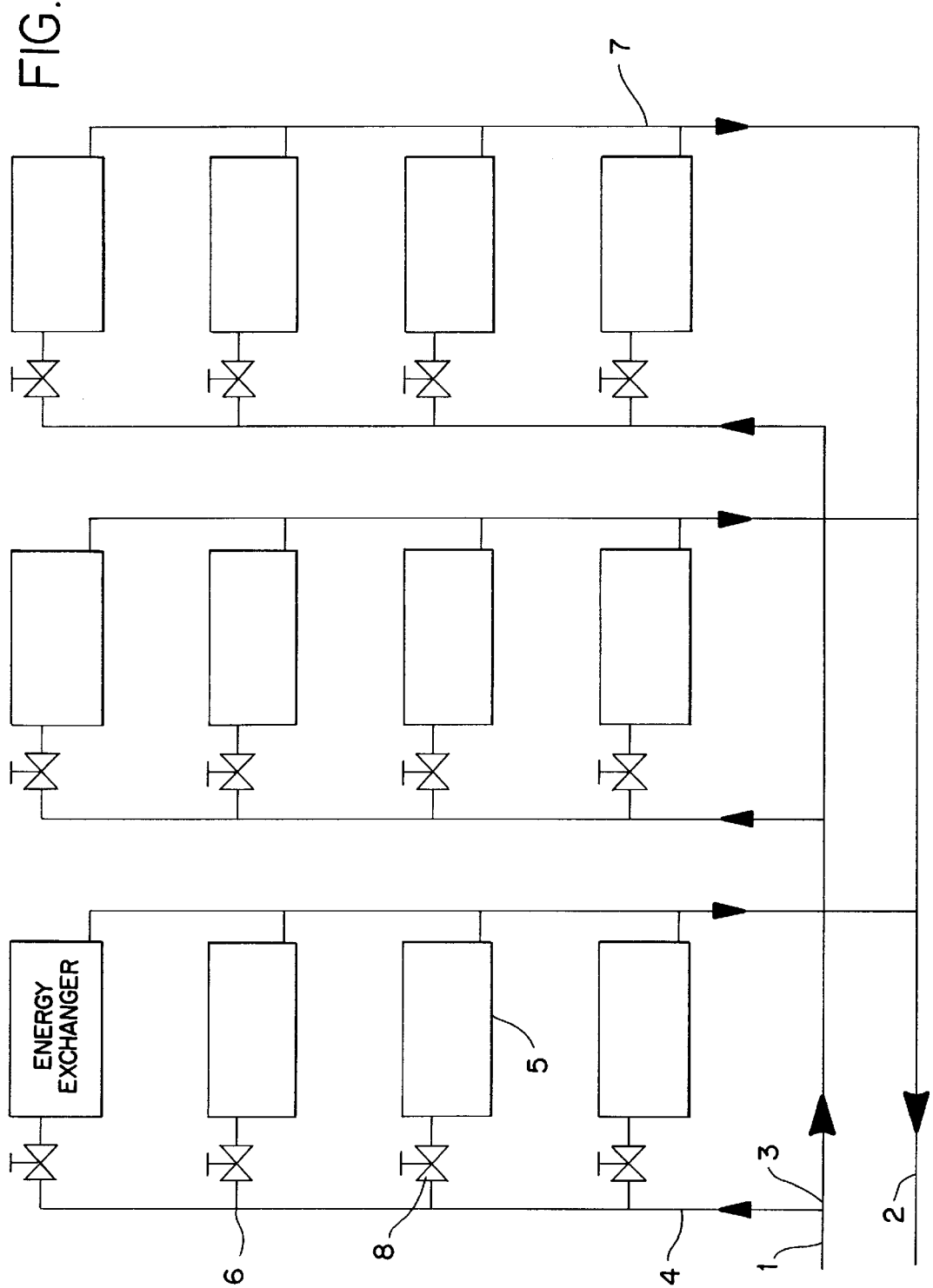

In FIG. 1 is shown a double-pipe energizing plant, one pipe of which is the main pipe 1 which leads the energy-carrying medium, such as water, from a source of energy, which is not illustrated, in the energizing plant, and the second pipe is a return pipe 2 which leads the medium back to the boiler.

From a branch point 3 there extends a first side pipe 4 which leads the medium forward to a number of energy exchangers 5, each of which is connected to the first side pipe 4 at connection points 6 and to the second side pipe 7 which leads the medium back to the return pipe 2.

Each energy exchanger 5 is provided with a valve 8 according to the invention, which is arranged to control the flow of the energy-carrying medium through the respective energy exchangers 5.

Figure 2:
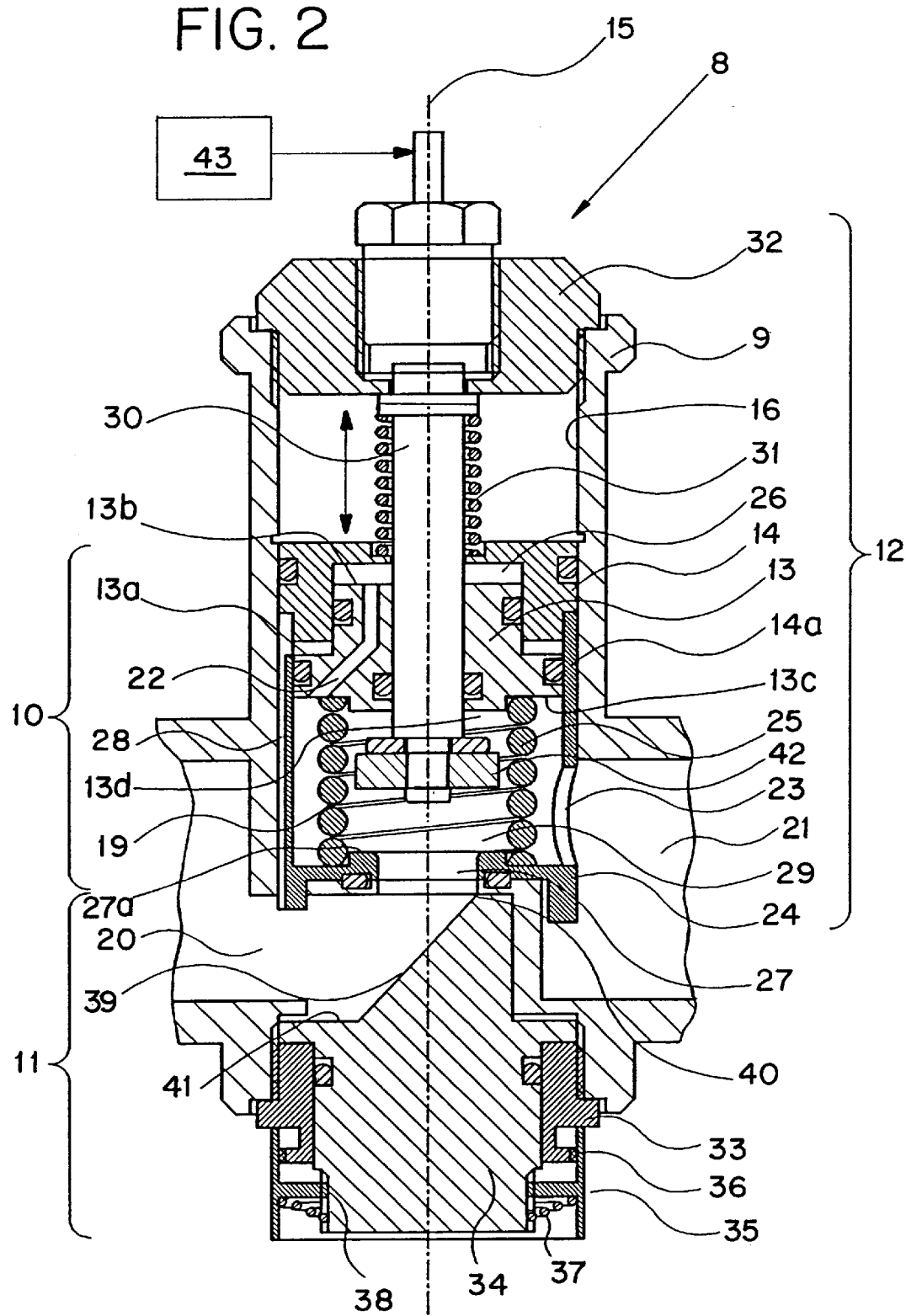
FIG. 2 shows a section through an embodiment of the valve according to the invention.

In FIG. 2 is shown an embodiment of the valve according to the invention, said embodiment comprising a housing 9 which contains a combination of a differential pressure valve 10, an adjustable pre-setting 11 and a thermostat valve 12.

The differential pressure valve 10 comprises a first, cup-shaped bush 14 which is placed in a bore 16 which is coaxial with the axis 15 of the housing 9. The first cup-shaped bush is connected with a second cup-shaped bush 14a which is arranged in such a manner that the bottoms in the two bushes face away from each other. The bottom in the second cup-shaped bush 14a forms a transverse wall 24 in the valve 8.

In the space between the bottoms in the two cup-shaped bushes 14, 14a, there is housed a piston 13 which is stepped in diameter, of which the part with the smallest diameter lies inside the first cup-shaped bush 14, and the part with the largest diameter is inside the second cup-shaped bush 14a. The step between the two diameters hereby forms a first area 13a on the piston 13 in an annular space at the transition between the two cup-shaped bushes 14, 14a. That part of the piston 13 which is enclosed within the first cup-shaped bush 14 demarcates a space 26, where the area of the end surface of the piston 13 is indicated with the reference FIG. 13b in the drawing.

Furthermore, a helical spring 25 is inserted between the bottom or the transverse wall 24 in the second cup-shaped bush 14a and the front of the piston 13. The spring 25 is secured in a centred manner on the front of the piston 13 by means of an annular recess or stepping-down, whereby radially outside the spring 25 said spring 25 demarcates a circular area indicated by the reference FIG. 13c, and also a circle with the area 13d inside the spring. From the front radially outside the spring 25, i.e. from the area 13c to the above-mentioned end surface 13b, the piston 13 also has a through-going bore 22.

Transversely to the bore 16, the housing 9 has an inlet 20 and an outlet 21 for the medium, and along the circumference the second cup-shaped bush 14a is provided with a longitudinal channel 28 which extends from the inlet 20 to the above-mentioned circular space with the area 13a on the piston 13.

From FIG. 2 it will be clear that a medium which is led in through the inlet 20 will be able to flow through the bore 22 and exercise a pressure against the end surface 13b of the piston 13 in the space 26, so that the piston 13 compresses the spring 25.

The medium can also flow from the inlet 20 through an opening 27 with a seating 27a, which is configured in the bottom or the transverse wall 24 of the second cup-shaped bush 14a, and flow further into the space 29 enclosed within the windings of the spring 25.

The area of the space 19 between the windings of the spring 25 changes in size depending on the length of the spring 25, in that the area is increased when the spring is extended and reduced when the spring 25 is compressed by the piston 13. If the spring is compressed completely together, so that the windings lie up against one another, the area can even be completely closed so that through-flow is prevented.

From the space 19, the medium can flow out of the second cup-shaped bush 14a through an opening 23 which opens out in the outlet 21.

By a suitable dimensioning of the areas 13a, 13b, 13c and 13d of the piston 13 in relation to the pressure of the spring 25, with a displacement of the piston and the consequent changing of the area of the space 19 between the windings of the spring 25, there can be generated a desired differential pressure across the inlet 20 and the thermostat seating 27a with an associated seal 42.

The adjustable pre-setting 11 can be set to a desired through-flow opening by being turned around the axis 15, and can thereafter be locked in its setting. It can, for example, be configured as follows:

In one end of the housing 9 there is screwed a threaded bush 33 in which a cylindrical plug 34 is secured in a manner in which it cannot be displaced in the direction of the axis 15 of the housing 9, but can be turned around said axis. At the free end of the threaded bush 33, there is also provided a bush-shaped setting element 35. In a radial plane, the threaded bush 33 and the setting element 35 have cooperating teeth 36 which extend for a short distance axially. In a locking position for the setting element 35, the teeth 36 prevent a relative turning of the parts 33, 35, whereby the plug 34 is also prevented from turning. On the other hand, in a second position in which the setting element 35, against the pressure of a conical spring 37 which is compressed between a flange on the plug 34 and a contact surface in the setting element 35, is drawn out axially in relation to the threaded bush 33, the engagement between the teeth 36 is terminated. In a second radial plane there are cooperating teeth 38 on the setting element 35 and the plug 34, whereby the setting element 35 can turn the plug in the threaded bush 33 when the setting element 35 is drawn axially out from the threaded bush 33, in that the teeth 38 on the plug 34 have adequate axial extension for this purpose.

That end of the cylindrical plug 34 which faces inwards in the housing 9, lies up against the outer side of the bottom or the transverse wall 24 in the second cup-shaped bush 14a. The plug 34 is configured with an inclined surface 39 which extends from the said end, in that the intersection between the end and the inclined surface 39 extends along a chord 40 on one side of the axis 15 of the plug, extends at an angle through the axis 15 of the plug and ends in a surface 41 which is at right angles to the axis 15.

The inlet 20 has a predetermined area, and in the position of the plug 34 shown in FIG. 2 there is unhindered flow through the inlet 20 and the opening 27 in the bottom or the transverse wall 24 of the second cup-shaped bush 14a. By turning the plug 34 at an angle of 180° around its axis in the threaded bush 33, and herewith in relation to the housing 9 and the inlet 20, the inlet 20 will be blocked. It will be clear that the turning of the plug 34 at angles of less than 180° from the shown position will block smaller or greater parts of the inlet 20, hereby making it possible to select a desired area of flow through the inlet 20 and to the opening 27.

The thermostat valve 12 is of commonly known construction. Its arrangement comprises a spindle 30 which is surrounded by a helical spring 31 which with its one end abuts against a locking element 32 in the housing 9, and with its other end against the bottom of the first cup-shaped bush 14 in the housing. Outside the housing 9, the spindle 30 is connected to a thermostat bellows 43 which can displace the spindle 30 in its longitudinal direction depending on the surrounding temperature and against the pressure from the spring 31. The spindle 30 also has the above-mentioned seal 42 which can close the opening 27 with the seating 27a in the bottom or the transverse wall 24 of the second cup-shaped bush 14a, regardless of the setting of the differential pressure valve 10 and the adjustable pre-setting 11.

We claim:

1. A valve for a system having an energy-carrying medium which flows through a number of energy exchangers in the system, the valve comprising: a thermostat valve with a housing having an inlet and an outlet, a spindle displaceable by a thermostat bellows and having a seal, and which depending on the expansion/contraction of the thermostat bellows and against the pressure of a spring which surrounds the spindle can respectively close and open an opening with a seating in a transverse wall in the housing between the inlet and the outlet, wherein the valve further comprises a differential pressure controlled piston for the regulation of the differential pressure of the energy-carrying medium across an adjustable pre-setting and the thermostat valve comprises the seating and the seal between the inlet and the pistons and the thermostat valve is arranged to be able to cut off the flow between the inlet and the outlet independently of the adjustable pre-setting.

2. The valve according to claim 1, wherein the piston of the differential pressure valve is surrounded by a first cup-shaped bush and is herewith connected to a second cup-shaped bushy the bottoms of which face in opposite directions and are disposed in a bore which is coaxial with the axis of the housing, that the piston is stepped in diameter, whereby the part with the smallest diameter lies in the first cup-shaped bush, and a channel leads from the front of the piston to the rear of the piston.

3. The valve according to claim 2, further comprising a spring provided between the piston and the transverse wall of the second cup-shaped bush in such a manner that the area of the space between the windings of the spring can be varied depending on the movement of the pistons the transverse wall having the opening which is limited by the seating.

4. The valve according to claim 3, wherein the second cup-shaped bush has on its outer side at least one longitudinal channel which, from the inlet, leads to an annular space between the two bushes, in which space at the stepping of the piston there is formed a first area, that inside the first cup-shaped bush the rear of the piston has a second area, and in that the spring, at its abutment against the piston inside the second cup-shaped bush on its outer side demarcates a third area and on its inner side a fourth area.

5. The valve according to claim 1, wherein the adjustable pre-setting comprises a cylindrical plug which, by a threaded bush is secured in a rotatable manner but lockable in the housing, that the plug with the end outside the housing lies up against the transverse wall of the second cup-shaped bush, and is configured with an inclined surface which runs from a chord on one side of the axis of the plug, extends at an angle through the axis beyond the inlet and ends in a surface which is at right angles to the axis.

6. The valve according to claim 5, wherein the threaded bush is surrounded by a setting element, in a radial plane on the threaded bush and the setting element there are cooperating teeth with a slight axial extension, which in a locking position for the setting element prevent mutual rotation between the threaded bush and the setting element, and in that the plug and the setting element in a second radial plane have cooperating teeth, where the teeth on the plug have a predetermined axial length, so that the setting element in a second position drawn out of the locking position can turn the plug in the housing.

7. The valve according to claim 6, wherein the setting element is held in the locked position by a spring which is inserted between a flange on the plug and a contact surface on the setting element.

8. The valve according to claim 1, wherein the thermostat valve comprises a spindle which extends through the first cup-shaped bush and the piston, that the spindle is surrounded by a spring which is compressed between a locking element and the bottom of the first cup-shaped bush, and in that the spindle, on that end which projects into the space which is surrounded by the spring, has the seal which is arranged to lie up against the seating and close the opening.

9. A valve comprising:
 a housing having,
  a thermostat valve having,
   an inlet;
   an outlet;
   a spindle displaceable by an expandable and contractible thermostat bellows;
   a spring surrounding the spindle;
   an opening with a seating and an associated seal in a transverse wall of the housing between the inlet and the outlet capable of being closed and opened by the seal depending on the expansion and contraction of the thermostat bellows;
  a differential pressure valve having a piston;
  an adjustable pre-setting located within the housing to set a desired area of flow through the inlet to the opening;
 wherein the thermostat valve is arranged to be able to cut off the flow between the inlet and the outlet independently of the adjustable pre-setting, and
 wherein the differential pressure valve generates a desired differential pressure across the adjustable pre-setting and across the seating with the associated seal.

10. The valve according to claim 9, further comprising:
 a first cup-shaped bush with a first bottom surrounding the piston in a bore which is coaxial with the axis of the housing;
 a second cup-shaped bush with a second bottom connected to the piston so that the first and second bottoms face in opposite directions; and
 a channel in the piston leading from a front of the piston to a rear of the piston;
 wherein the piston is stepped in diameter whereby the smallest diameter lies in the first cup-shaped bush, and
 wherein the second bottom forms the transverse wall.

11. The valve according to claim 10, further comprising:
 a spring having windings with a space between each winding, the spring provided between the piston and the transverse wall of the second cup-shaped bush; and
 an opening on the transverse wall which is limited by the seating;
 wherein the area of space between the windings of the spring can be varied depending on the movement of the piston.

12. The valve according to claim 11, further comprising:
   a longitudinal channel on the outer side of the second cup-shaped bush that leads from the inlet to an annular space between the first and second bushes;
   a first area formed at the annular space at the step of the piston;
   a second area on the rear of the piston inside the first cup-shaped bush;
   a third area on the outer side of the spring at the spring's abutment against the piston inside the second cup-shaped bush; and
   a fourth area on the inner side of the spring at the spring's abutment against the piston inside the second cup-shaped bush.

13. The valve according to claim 9 wherein the adjustable pre-setting further comprises:
   a cylindrical plug secured in a rotatable manner and lockable to the housing by a threaded bush, the plug lying up against the transverse wall of the second cup-shaped bush; and
   an included surface configured on the plug from a chord on one side of an axis of the plug extending at an angle through the axis beyond the inlet and ending in a surface which is at right angles to the axis.

14. The valve according to claim 13, further comprising:
   a setting element surrounding the threaded bush;
   cooperating teeth with a slight axial extension in a radial plane in the threaded bush;
   a locking position for the setting element that prevents mutual rotation between the threaded bush and the setting element; and
   a second radial plane of the plug and the setting element have cooperating teeth, where the teeth on the plug have a predetermined axial length wherein the setting element in a second position drawn out of the locking position can turn the plug in the housing.

15. The valve according to claim 14, further comprising:
   a second spring inserted between a flange on the plug and a contact surface on the setting element holding the setting element in a locked position.

16. The valve according to claim 9, the thermostat valve further comprising:
   the spindle extending through a first cup-shaped bush with a bottom and the piston; and
   a locking element;
   wherein the spring surrounding the spindle is compressed between the locking element and the bottom of the first cup-shaped bush.

* * * * *

UNITED STATES PATENT AND TRADEMARK OFFICE
CERTIFICATE OF CORRECTION

PATENT NO.   :   5,931,375

DATED        :   August 3, 1999

INVENTOR(S)  :   Hans Henrik Gylov et al.

It is certified that error appears in the above-identified patent and that said Letters Patent is hereby corrected as shown below:

On the title page at [75] Inventors: change "Holm" to --Holte--; and change "Slagelsc" to --Slagelse--.

Column 5, line 30 (claim 1, line 15): change "pistons" to --piston,--.

Column 5, line 36 (claim 2, line 4): change "bushy" to --bush,--.

Column 5, line 46 (claim 3, line 5): change "pistons" to --piston,--.

Signed and Sealed this

Eighth Day of February, 2000

Attest:

Q. TODD DICKINSON

Attesting Officer       Commissioner of Patents and Trademarks